Jan. 24, 1967     T. ASHWORTH, JR     3,299,474
QUICK CHANGE APPARATUS FOR EXTRUSION DIES
Filed March 30, 1965     2 Sheets-Sheet 1
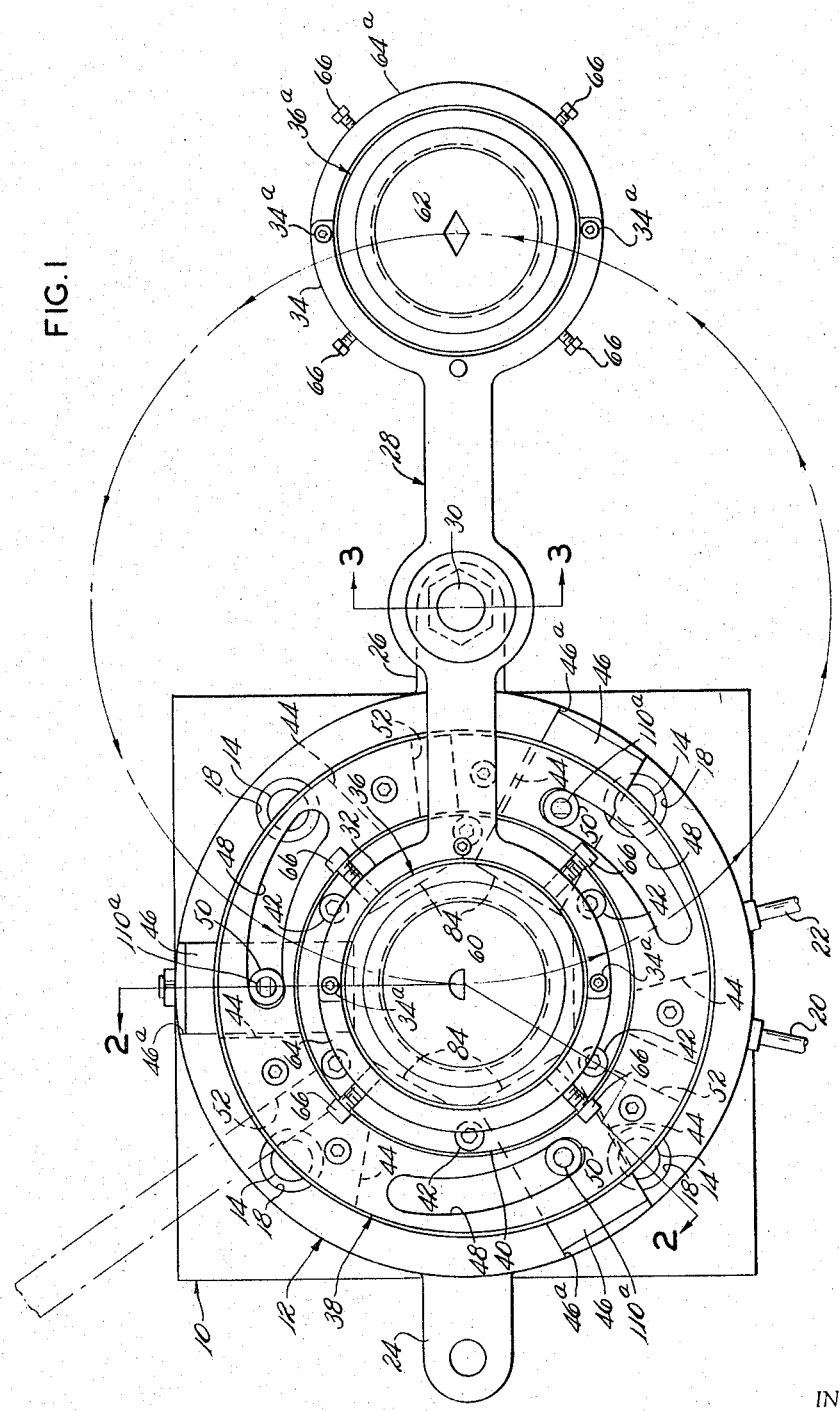
INVENTOR.
THOMAS ASHWORTH, JR
BY Oldham & Oldham
ATTYS.

Jan. 24, 1967   T. ASHWORTH, JR   3,299,474
QUICK CHANGE APPARATUS FOR EXTRUSION DIES
Filed March 30, 1965                                         2 Sheets-Sheet 2

INVENTOR.
THOMAS ASHWORTH, JR
BY Oldham & Oldham
ATTYS.

United States Patent Office 3,299,474
Patented Jan. 24, 1967

3,299,474
QUICK CHANGE APPARATUS FOR EXTRUSION DIES
Thomas Ashworth, Jr., Cuyahoga Falls, Ohio, assignor to Ashworth-McDade, Inc., Cuyahoga Falls, Ohio, a corporation of Ohio
Filed Mar. 30, 1965, Ser. No. 443,978
18 Claims. (Cl. 18—12)

This invention relates to a quick change mechanism for extrusion dies, and more particularly to apparatus which may be associated with conventional extrusion equipment incorporating a pivotal arm carrying extrusion dies, which dies may be removably locked into position upon rotation of a cam locking ring, thus allowing rapid die changing and cleaning procedures eliminating down time to extrusion equipment.

Heretofore it has been well known that in normal extrusion equipment utilizing a single supporting member for a die holder that the die fixtures are normally held in by screw threads or suitable bolt, screw holding means, or clamp arrangements. Such means must be removed to remove the die fixtures to permit cleaning and changing for further extrusion processes. Normally, this process takes between ten to about thirty minutes for cleaning and die or screen changes, and in some instances, there must be ten to twelve changes during an eight hour working shift which would mean the particular extrusion equipment so utilized would be down for cleaning and changing more than half the total operating time in an eight hour shift. Such down time is costly to employers, manufacturers, and must ultimately be passed onto the public at large. Improvements expediting the down time on cleaning of fixtures and changing of die or screen packs in conventional extrusion equipment is badly needed by the art.

Therefore, it is the general object of the present invention to avoid and overcome the foregoing and other difficulties of and objections to prior art practices by the provisions of a quick changing die mechanism which may be associated with conventional extrusion equipment to provide die or screen pack changes in about two minutes time to thereby substantially reduce down time on the extrusion equipment.

A further object of the invention is to provide a quick change mechanism for extrusion dies which incorporates a quick clamping mechanism consisting of three keys actuated by a three segment eccentric locking ring to lock a die adapter in relation to a base mounting support in fluid tight fashion upon approximately a 10 to 45 degree rotation of the clamping ring.

A further object of the invention is to provide a quick change die mechanism which incorporates a pivotal arm for mounting die adapter means, which arm is also slidable and tiltable about a central pivot to allow the die adapter means carried on the ends thereof to be positioned relative to a support head and quickly locked into position by locking keys.

A further object of the invention is to provide a quick change die mechanism utilizing a support arm carrying die adapters wherein the support arm may carry a plurality of die adapters so that a particularly desired die may be quickly positioned upon removal of another die, with the removed die and its adapters being subsequentially cleaned after the apparatus is placed back into operation.

A further object of the invention is to also provide, in a quick change die mechanism, the technique of substantially conventional dusting with a dry or liquid lubricant that may be injected into the center of a hollow extrusion.

A further object of the invention is to provide an improved heating or cooling means for the throat of a die adapter during extrusion operation to more specifically control the extrusion properties of plastic, rubber, or other materials being extruded.

The aforesaid objects of the invention and other objects which will become apparent as the description proceeds are achieved by providing in a quick change die mechanism for extrusion equipment the combination of an extrusion housing having an open cylinder, an annular support head mounted to the housing in concentric alignment with the cylinder, an annular locking ring rotatably mounted to the support head in concentric alignment with the cylinder, an elongated support arm mounted in sliding, pivoting, and tilting relationship to the outer circumference of the support head, a die adapter means removably mounted at each end of the support arm and each being separately removably received into the concentrically aligned openings of the locking ring and the support head, each of said die adapter means being locked into fluid tight relation with respect to the support head upon a partial rotation of the locking ring, and die means removably received in each of the die adapter means.

For a better understanding of the invention reference should be had to the accompanying drawings wherein:

FIGURE 1 is a plan view of a quick change die mechanism, for association with extrusion apparatus, comprising a preferred embodiment of the invention;

Figures 2, 3:
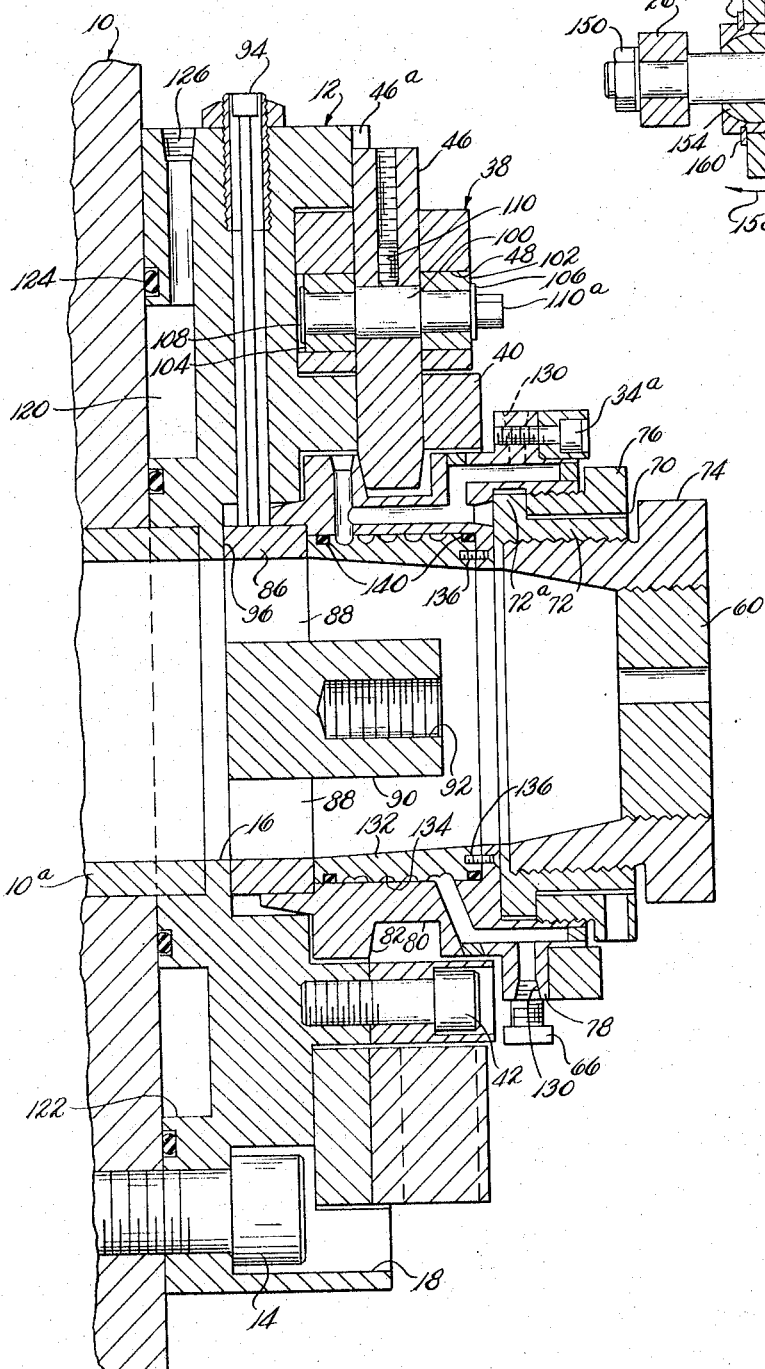
FIGURE 2 is an enlarged vertical cross sectional view of the support head and associated apparatus of the quick change die mechanism taken on line 2—2 of FIGURE 1.
FIGURE 3 is a vertical cross sectional view of the mounting pin for the support arm, as taken on line 3—3 of FIGURE 1.

With reference to the form of the invention illustrated in FIGURE 1 of the drawings, the numeral 10 indicates generally an extrusion housing of the conventional type which has a central cylinder 10a (not shown in FIGURE 1) in which is operatively positioned some type of material transporting screw which forces material to be extruded through the cylinder under a relatively constant pressure. A support head, indicated generally by numeral 12, is operatively mounted in fixed sealed relation to the housing 10 by means of a plurality of bolts 14. The support head 12 is annular in shape and, as best seen in FIGURE 2, has a hole 16 therethrough which is substantially the same size and shape as the cylinder 10a through the housing 10. The bolts 14 mounting the support head 12 to the housing 10 may be set in counterbored recesses 18 to make them non-obstructive to the remainder of the apparatus associated therewith. Substantially conventional cooling water inlet and outlet tubes 20 and 22 may be provided for the support head 12, as desired, to communicate to cooling or heating passages as more fully described hereinafter.

In order to provide the quick die change features of the invention, the support head 12 has radially outwardly directed brackets 24 and 26 mounted at substantially diametrically opposed positions thereon. A turret support arm, indicated generally by numeral 28 is shown mounted in pivotal relationship to the bracket 26 by a fulcrum pin 30. Of course, it should be understood that a similar arm could be mounted to the bracket 24, and that each arm might have more than the two legs 32 and 34, indicated for arm 28, extending therefrom. These legs have bifurcated ends. Each of the legs 32 and 34 removably mounts a die adapter, indicated generally by numerals 36 and 36a. The die adapters 36 and 36a may be secured to the bifurcated end of legs 32 and 34 by bolts or other means 34a passed therethrough and connected to respective radially directed flanges 64 and 64a.

The problem then solved by the invention is that of securely locking the die adapters 36 and 36a into fixed fluid tight relationship with respect to the support head 12. To accomplish this purpose, a locking ring, indicated generally by numeral 38, is mounted in concentric and rotatable relationship with respect to the support head 12. The locking ring has three radially directed slots, indicated generally by dotted lines 44 passing therethrough, with each slot extending somewhat less than ⅓ the circumference of the ring 38. These slots 44 slidably receive directed wedges 46 which have slightly tapered inner ends, as more clearly seen in FIGURE 2. In order to provide radial movement of the wedges 46, elongated slightly eccentric slots 48 are cut in the locking ring 38 substantially perpendicular to the radial slots 44 and the majority of the length thereof which receive wedge mounting shafts 50 passing through the center of the wedges 46 in a close sliding relationship. Thus, it should be understood that upon rotation of the locking ring 38 about 10° and about 45°, the wedges 46 will slide radially in and out so that the tapered end portions may provide a wedging locking action upon the particular die adapter positioned therein to provide a fluid tight metal-to-metal engaging relation between the support housing 12 and the die adapter positioned therein. Rotation of the ring 38 may be made by a suitable bar positioned in receiving slots 52 positioned between the radially directed slots 44, as more clearly seen in FIGURE 1, or by any direct or indirect mechanical advantage activator rotating the locking ring 38. To insure a substantially radial movement of the wedges 46 upon the rotation of the ring 38, the wedges 46 are received in close tolerance slots 46a in the support head 12. Annular ring 40 secured to support head 12 by bolts or other means 42 holds the lock ring 38 and the wedges 46 in a rotatable relationship with support head 12.

Of course, a suitable die 60 or 62 may be removably screwed in or be otherwise fixedly positioned on each respective die adapter 36 and 38. The invention illustrates that a die 60 may be half cylindrically or otherwise shaped, while a die 62 will be of a suitable diamond or otherwise shaped.

In order to accurately position the dies 60 and 62 with respect to the cylindrical opening 10a in the housing 10 and the opening 16 through the support head 12, the flanges 64 and 64a form a fixed part of an adapter housing 78 which is the main unit of each of the die adapters 36 and 36a. Such flanges 64 and 64a utilize a plurality of die adjusting screws 66 to thereby control the position of the dies 60 and 62 relative to the bore through the center of the support head 12. As seen in FIGURE 2, such adjustment is possible because of the radial clearance at area 70 between a die holder 72 and the adapter housing 78. The die holder 72 threadably receivers a die housing 74, which housing 74 in turn threadably receives the die 60. The die adjusting screws 66 are designed to bear against the radially outer surface of the bottom shoulder 72a of the die holder 72. Thus, it is seen how with the four adjusting screws 66 that the die 60 can be properly positioned and/or centered in the housing 78. Once the die 60 has been properly positioned, a die locking ring 76 may be threadably received into the adapter housing 78 to securely butt the outer or upper surface of the bottom shoulder 72a of the die holder 72 against the adapter housing 78 to properly and securely position the entire assembly. Of course, according to the usual practice, adjustment of the die 60 can be made during operation or as necessary by the adjusting screws 66.

The adapter housing 78 comprises an important portion of the die adapter indicated generally by numeral 36a. This adapter housing 78 is provided with an annular recessed groove 80 having an outwardly tapered wall or inner surface 82 which receives and engages the tapered end of the wedges 46. Also, in order to receive the blunt substantially flat ends of the wedges 46, this groove 80 is cut to six flat surfaces, indicated by the dotted lines 84 in FIGURE 1. The reason for having six flats 84 in the recessed groove 80 is to allow positioning of two or more support arms, such as a support arm on the bracket 24.

The tolerance allowable between the groove 80, its tapered surface 82, and the tapered surface 48 of the wedges 46 must be quite exact so that an adequate wedging locking action is obtained. The actual wedging or locking action of the housing 78 to the support head 12 in fluid tight relation is provided by a spider or conventional filler ring 86 removably positioned in a recess on the bottom opening to the adapter housing 78. The pressure exerted by the radially inward movement of the wedges 46 upon rotation of the locking ring 38 passes through the shoulder surface 82 of the recess 80 of the adapter housing 78 and through the ring 86 to form a metal to metal fluid tight fit against a radially inwardly directed flange 96 from the support head 12.

The ring 86 may be the conventional spider having arms 88 supporting a central core 90 on which suitable die fixtures might be mounted in the threaded hole 92 to provide a hollow extrusion through the die 60, all in a well known manner. Further, in order to also provide well known expedients of the art, a dry or liquid lubricant or dusting compound for hollow extrusions may be provided to the spider 86 through an access opening 94 positioned radially through the support head 12 and appropriately connecting in communication to receiving passages in the spider 86. It should be also understood that conventional filler ring or a combination of filler ring, screen support plate and screens, and/or spider might appropriately be utilized.

In order to insure a free floating action of the wedges 46 with an equal contact of each wedge with the recess 80, the wedge mounting shafts 50 have an eccentric portion 100 passing in close fitting sliding relationship relative to its respective wedge 46. In order to utilize this eccentric mounted relationship, each end of the shaft 50 is supported in its specific eccentric slot 48 by appropriate needle or roller bearings 102 and 104, respectively, which are held in position relative to the shaft 50 by appropriate snap locking rings or washers 106 and 108. The heads 110a of the shafts 50 are flat on at least two sides to allow turning thereof to appropriately radially direct the wedges 46 relative to the support head 12 for corrective adjustment thereof. Thus, the invention contemplates that each wedge 46 will be individually adjusted by the eccentric 100 on its individual mounting shaft 50 to appropriately provide a free floating relationship of each wedge in exactly the same relationship to the others to provide an equal wedging action when the locking ring 38 is appropriately rotated. Once the eccentrics 100 have been appropriately adjusted, suitable set screws 110 passing through the radially outward end of the wedge 46 lock or fix the adjusted relationship.

In order to provide suitable cooling or heating during the extrusion process, an appropriate annular passage 120 is formed in the base of the support head 12. Suitable O-ring sealing means 124 are provided to prevent leakage of fluid through passage 120 between the butt joining of the head 12 and the housing 10. A suitable access or outlet opening 126 from the support head 12 may be appropriately provided for connection to the inlet or outlet tubes 20 and 22 of FIGURE 1. The passage 120 generally has a baffle between tubes 20 and 22 so all fluid will flow in only one direction therethrough.

Further, however, in order to appropriately provide necessary heating or cooling to the housing 78 of the die adapters 36 and 36a, suitable access or outlet openings 130 may be provided therein with connecting passageways therethrough, as clearly shown in FIGURE 2.

As an important feature of the invention, a throat heat transfer ring 132 may be positioned internally of the adapter housing 78 with a spiraled recess 134 positioned around the external circumference thereof to receive a flow of cooling or heating fluid to more particularly transfer heat from or to extrusion material passing against the radially inner surface thereof. The invention contemplates that suitable locking screws 136, might be provided to further position the internal heat transfer ring 132 relative to the adapter housing 78. Heat transfer in the die fixtures, or those members comprising the adapter housing 78, the die holder 72 and the die housing 74 has always been a problem, and it has been found that the internal heat transfer ring 132 with the spiral groove 134 around the external circumference thereof has quite adequately solved this problem. Of course, it should be recognized that the depth of the groove 134 could be varied in accordance with the tapered internal surface of the ring 132 to more appropriately provide suitable heat transfer, as desired. In order to seal the fluid passing through the groove 134 of the ring 132, appropriate O-sealing rings 140 are provided.

To understand the structural relationship of the mounting or fulcrum pin 30 for the die adapter support arm 28, reference should be had to FIGURE 3 wherein it is seen that the pin 30 has an elongated substantially cylindrical shaft 30a with a recessed end portion passing through the support bracket 26 and having the flange thereof butted against the bracket and securely held in position by a locking nut 150. The arm 28 has a hole through the center thereof of substantially the same size and shape as a spherical bearing, indicated generally by numeral 152. The bearing 152 comprises an inner race 154 slidably received upon the shaft 30a of the pin 30 with the outer race 156 having a radially inner curved surface in complementary relationship with the radially outer curved surface of the inner race 154 to accomplish a tilting action of the arm 28, in a manner indicated by the arrow 158. Of course, the tilting will be limited by the outer race 156 engaging the shaft 30a of the pin 30. It is contemplated that the arm 28 slidably engages over the radially outer surface of the outer race 156 and is held or locked in position by suitable arc locking rings 160. Of course, it must then be understood that this type of mounting pin 30 allows the arm 28 to be slidable in a direction indicated by the arrow 162 as well as tiltable in a direction indicated by the arrow 158, as well as rotatable or pivotal about the pin 30. The sliding relationship, indicated by the arrow 162, permits the entire die alapter 36 to be moved out and clear from the support head 12 upon release of the wedges 46 by appropriate rotation of the locking ring 38. The arm may then be pivoted to position the other die adapter 36a into the head 12 for quick locking action by appropriate rotation of the ring 38. Therefore, it follows that the extruder may continue operation with a down time for change of die fixtures usually being less than two minutes. Cleaning of the used die and die adapter may then be accomplished during the operation of the extruder.

As shown in FIGURE 1 of the drawings, the counter-clockwise rotation of the locking ring will open the wedges allowing the die adapter to be removed or replaced, while the clockwise rotation will lock a particular die adapter into position. Thus, to make a die change, the extruding machine is shut down, the lock ring 38 is rotated to release the particular die adapter, the machine may then be started slightly to break the seal, and remove the particular slug therefrom, and the die adapter may then be fully removed with the subsequent insertion of a fresh adapter, followed by a cleaning of the old adapter after extrusion has begun with the new.

It is seen that the objects of the invention have been achieved by providing a quick change cam mechanism utilizing a plurality of locking wedges in association with eccentric slots in rotatable cam locking ring to quickly and securely lock a die adapter into secure position with respect to an extrusion cylinder, with such die adapter mounted on a pivotal arm which may carry one or more die adapters for rotation into fixed position to give quick die change and eliminate machine down time for extruding operation. Die adapter mounting arms can be positioned on either side of the supporting head, and any number of arms may be used which would be conveniently possible. Three locking keys appear to give a better floating action and more uniform lock to the die adapter than possible with a greater or lesser number of wedges. The tapered ends of the wedges fit in complementary relationship with a tapered recess in the die adapter housing to provide the secure sealing arrangement. A throat heat transfer ring is provided internally of the die adapter to appropriately heat or cool material being extruded therethrough to effect a better heat transfer through the die adapter assembly.

While in accordance with the patent statutes only one best known embodiment of the invention has been illustrated and described in detail, it is to be particularly understood that the invention is not limited thereto or thereby, but that the inventive scope is defined in the appended claims.

What is claimed is:
1. In a quick change die mechanism for extrusion apparatus the combination of
   a housing defining an extrusion cylinder,
   a ring shaped support head having an opening therethrough fixedly mounted to the housing in concentric alignment with the cylinder,
   a plurality of locking keys received for radial sliding movement by the support head,
   a cam ring mounted in limited rotatable relation to the support head and engaging said locking keys to effect substantially uniform radial movement thereof upon rotation of said ring,
   a bracket fixedly mounted to the circumferential edge of the support head and directed substantially radially therefrom,
   an elongated fulcrum pin mounted in fixed relation to the bracket so as to be in substantial alignment with the axis of the support head,
   a support arm mounted in sliding, pivotal and tilting relationship to the fulcrum pin, and
   a die adapter operatively mounted to the arm and receivable in the opening of the support head to be locked into position by the radially inward movement of the locking keys upon rotation of the cam ring in the proper direction.

2. A combination according to claim 1 where there are three locking keys, each mounted in eccentric relationship to the cam ring to permit individual adjustment of each locking key relative to the ring to insure a free floating and uniform wedging action of each key upon rotation of said ring.

3. A combination according to claim 1 where a heat transfer ring is positioned internally of the die adapter, and conduit means are provided to circulate fliud through the heat transfer ring to transfer heat from said die adapter in a more uniform manner.

4. A combination according to claim 1 where the arm has a plurality of separate legs each mounting a separate die adapter.

5. A combination according to claim 1 where the die adapter contains a spider for effecting hollow extrusions, and means are associated with the spider to provide a dusting powder or lubricant internally of the hollow extrusion.

6. In a quick change die mechanism for extrusion apparatus the combination of
   an extruder housing defining an opening thereto,
   a support head having a hole therethrough mounted to the housing so the hole is in substantial alignment with the opening in the housing, said hole being of similar size and shape to the opening in the housing,
   an annular cam locking ring having a plurality of radially directed elongated slots therethrough with a separate elongated eccentric slot through the ring perpendicular to and associated with each of said radially directed slots, a keeper ring mounted in fixed relation to the supporting head in concentric alignment therewith and retaining the cam locking ring in rotatable concentric alignment with the support head, an elongate wedge having a tapered inner end received in each radially directed slot of the cam locking ring, a separate eccentric pin positioned in close fitting slidable relation through each wedge and the eccentric slot associated with the radial slot receiving the wedge, means to lock the pin in relation to the wedge, roller means attached to each end of the respective pins and fitting such ends in close tolerance relationship to their respective eccentric slot, annular elongate die adapter means received in and concentrically aligned with the hole of the support head, a radially outwardly directed flange around the lower end of the die adapter means defining a recess having a tapered lower surface for receiving the tapered wedges to lock the inner end of the die adapter means in fluid tight metal to metal relation with the support head upon radially inward movement of the wedges occasioned by appropriate rotation of the cam locking ring, and die means removably received in the upper end of the die adapter means.

7. A combination according to claim 6 which includes a bracket fixedly mounted to the circumferential edge of the support head and directed substantially radially therefrom, an elongated fulcrum pin mounted in fixed relation to the bracket so as to be in substantial alignment with the axis of the support head, and a support arm mounted in sliding pivoting and tilting relationship to the fulcrum pin and operatively connected to the die adapter means.

8. A combination according to claim 6 where the support head and the die adapter are provided with passages to receive fluid for heat transfer, which further includes a heat transfer ring positioned internally of the die adapter and having a spiral fluid passage in communication with the passage of the die adapter to further enhance the heat transfer properties of the die adapter.

9. A combination according to claim 6 which includes an arm having many legs pivotally and tiltably mounted to the periphery of the support head wherein the die adapter is fixedly mounted to one of the legs with other die adapters mounted on the other legs to be moved into position for locking with respect to the support head upon completion of use of the die means received in the die adapter, and removal of the die adatper from the support head.

10. In combination, an extrusion housing having an open cylinder, an annular support head mounted to the housing in concentric alignment with the cylinder, a plurality of locking keys received for radial sliding movement by the support head, an annular locking ring rotatably mounted to the support head in concentric alignment with the cylinder, and engaging said locking keys to effect substantially uniform radial movement thereof upon rotation of said ring, an elongated support arm mounted in sliding, pivoting and tilting relationship to the outer circumference of the support head, a die adapter means removably mounted at each end of the support arm and each being separately removably received into the concentrically aligned openings of the locking ring and the support head, each of said die adapter means being locked into position with respect to the support head by the radially inward movement of the locking keys upon a partial rotation of the locking ring, and die means removably received in each of the die adapter means.

11. In a quick change die mechanism for extrusion apparatus the combination of a housing defining an extrusion cylinder, a support head having an opening therethrough fixedly mounted to the housing in concentric alignment with the cylinder, a plurality of locking wedges received in radial slidable relation by the support head, said wedges having tapered inner ends, a cam ring mounted in rotatable relation to the support head and engaging said locking wedges to effect substantially uniform radial movement thereof upon rotation of said ring, a plurality of brackets fixedly mounted to the support head and directly substantially radially therefrom, an elongated fulcrum pin mounted in fixed relation to each bracket so as to be in substantial alignment with the axis of the support head, a separate turret support arm mounted in sliding, pivotal and tilting relationship to each fulcrum pin, and a separate die adapter operatively mounted to each arm and receivable in the opening of the support head to be locked into position by the radially inward movement of the locking wedges upon rotation of the cam ring.

12. A combination according to claim 11, where there are three locking wedges, each mounted in eccentric relationship to the cam ring to permit individual adjustment of each locking wedge relative to the ring to insure a free floating and uniform application of pressure by each wedge upon rotation of said ring, and means to fix the relationship of each wedge respective to the cam ring after the individual adjustment thereof.

13. A combination according to claim 11 where passages are provided in the support head and the die adapter to pass fluid for heat transfer, and further where a heat transfer is positioned internally of the die adapter and having a fluid passage therearound in communncation with the passages of the die adapter to transfer heat from said die adapter in a more uniform manner.

14. In a quick change die mechanism for extrusion apparatus the combination of an extruder housing defining an opening thereto, a support head having a hole therethrough mounted to the housing so the hole is in substantial alignment with the opening in the housing, an annular cam locking ring having three radially directed elongated slots therethrough with a separate elongated eccentric slot through the ring perpendicular to and associated with said radially directed slots, a keeper ring mounted in fixed relation to the supporting head in concentric alignment therewith and retaining the cam locking ring in rotatable concentric alignment with the support head, a wedge having a tapered inner edge received in each radially directed slot of the cam locking ring, a separate pin positioned in close fitting slidable relation through each wedge and the eccentric slot associated with the radial slot receiving the wedge, means to lock the pin in relation to the wedge, roller means attached to each end of the respective pins and fitting such ends in close tolerance relationship to their respective eccentric slot, annular die adapter means received in and concentrically aligned with the hole of the support head, said die adapter means having a recess there around with a tapered inner surface receiving the tapered inner ends of the wedges to lock the inner end of the die adapter means in fluid tight metal to metal relation with the support head upon radially inward movement of the wedges upon appropriate rotation of the cam locking ring, and die means removably positioned toward the upper end of the die adapter means.

15. A combination according to claim 14 which includes an arm having one end mounted to the die adapter means with approximately the center of the arm mounted in pivotal, tilting and axially slidable relation to the outer periphery of the support head, which further includes a separate die adapter mounted to the other end of the arm for positioning in the support head upon removal of the other die adapter.

16. In combination an extrusion housing having an open cylinder, a support head having a hole therethrough mounted on the housing whereby the hole is in concentric alignment with the cylinder, a plurality of wedges received for radial sliding movement by the support head, an annular locking ring mounted on the housing for limited arcuate movement in concentric alignment with the cylinder, and engaging said wedges to effect substantially uniform radial movement thereof upon rotation of said ring, an elongated support arm having at least two operative end portions mounted at about the center thereof on the outer circumference of the support head in limited sliding relation parallel to the axis of the cylinder, said support arm also being pivotal about its sliding mounting perpendicular to the axis of the cylinder, a die adapter means removably mounted at each operative end portion of the support arm, and each being separately receivable in operative engagement with the aligned holes of the locking ring and the support head upon a sliding movement of said arm parallel to the axis of the cylinder each of said die adapter means being locked into position with respect to the support head by the radially inward movement of the wedges upon limited arcuate movement of the locking ring, and die means removably received in each of the die adapter means.

17. A combination according to claim 16 where another arm having at least tow operative end portions is mounted on the outer circumference of the support head in the same manner as the first support arm, and which end portions mount separate die adapter means.

18. A combination according to claim 16 wherein said wedges when moved to their radially inward limit engage the die adapter means and lock it into fluid tight relation with the support head.

References Cited by the Examiner

UNITED STATES PATENTS

| 1,947,202 | 2/1934 | Homeier | 18—12 |
| 2,279,540 | 4/1942 | Voth et al. | 18—17 |
| 2,308,948 | 1/1943 | Bosomworth | 18—17 |
| 2,393,503 | 1/1946 | Bosomworth et al. | 18—17 |
| 2,773,283 | 12/1956 | Malamoud et al. | 18—12 X |

WILLIAM J. STEPHENSON, *Primary Examiner.*